Patented July 14, 1953

2,645,643

UNITED STATES PATENT OFFICE 2,645,643

PROCESS FOR PRODUCING PHTHALOCYANINE COLORING MATTERS

Hans B. Gottlieb, Glassboro, N. J., assignor to E. I. du Pont de Nemours and Company, Wilmington, Del., a corporation of Delaware No Drawing. Application October 6, 1950, Serial No. 188,883

8 Claims. (Cl. 260—314.5)

This invention relates to improved phthalocyanine coloring matters in the pigmentary state.

It is an object of this application to provide a process for reducing coloring matters of the phthalocyanine series into a state of fine particle size adapted for use as pigments in liquid paint vehicles and being characterized by good texture and high tinctorial qualities. Additional important objects of this invention will appear as the description proceeds.

In U. S. Patent 2,402,167, Lang and Detrick teach that phthalocyanine coloring matters may be produced in a highly divided form, having fine pigmentary qualities, by ball-milling the same in dry state with a water-soluble salt, such as sodium chloride or sodium sulfate, then extracting the salt with water and drying the pigment. According to these inventors, best results are obtained when the quantity of salt employed is from 4 to 20 times the weight of the pigment.

In copending applications Serial Nos. 79,894 and 122,222 (U. S. P. 2,556,728 and 2,556,730), Graham teaches that the aforegoing process may be improved by adding to the dry mixture being milled a small quantity of certain organic liquids, insufficient to convert the mixture into a doughy or pasty mass. The liquids there chosen are defined by their ability to transform the alpha form of copper phthalocyanine into the beta form, and are exemplified by ethyl alcohol, methyl alcohol, acetone, xylene, trichlorobenzene, sym. tetrachlorethane, tetrachlorethylene, tetrahydronaphthalene, kerosene, pinene and isooctane. The preferred quantity of organic liquid is specified as between 0.05 and 0.5 part by weight for each part of pigment employed. The improvement observed is that when starting with a crude phthalocyanine in beta crystalline form, the pigmentary product obtained after washing with water and drying is still in the beta crystalline form, which is generally greener in shade than the alpha crystalline form (otherwise obtained by the Lang and Detrick process), and which furthermore has the most important practical advantage of being stable in aromatic solvents, as contrasted with the alpha form which (in the case of chlorine-free phthalocyanine) undergoes crystal growth and loss of tinctorial strength.

I have now found that the aforegoing salt-grinding processes, whether applied to chlorine-free phthalocyanines or highly chlorinated phthalocyanines, may be further improved by incorporating in the dry mixture being milled a minute quantity of a solvent-active dispersant having in its molecular structure radicals of a long-chain fatty acid. By a minute quantity I mean from 0.01 to 0.1 part by weight for each part by weight of pigment.

By a long-chain fatty acid I mean an aliphatic carboxylic acid having from 8 to 30 carbon atoms, for instance stearic, palmitic, oleic, lauric, behenic, or montanic acid.

By a "solvent-active dispersant" I mean a compound having the capacity of acting as a dispersing agent in non-ionizing organic liquid media, for instance the liquids named hereinabove and taken from said Graham application, or liquids which are commonly employed as vehicles for paints, lacquers and varnishes. As typical illustrations of solvent-active dispersants useful in my invention I may mention such recently developed synthetic compounds as the polytitanium-stearates [copending applications of Langkammerer, Serial No. 170,703 (U. S. P. 2,621,193), and Balthis, Serial No. 176,056 (U. S. P. 2,621,194)], sorbitan oleate or stearate (U. S. P. 2,380,166), hexyl-phenyl stearate, and of course the corresponding salts and esters of other fatty acids having from 12 to 30 carbon atoms. All these compounds are characterized by possessing one or more stearate, oleate or other fatty-acid radical per molecule; then too, they are all insoluble in water, soluble in organic solvents, and exhibit activity as dispersing agents in such organic solvents.

The principal improvement observed by me from the addition of the aforementioned fatty-acid materials is in the texture and tinctorial qualities of the final product.

Texture of a pigment, as used in this specification, refers to softness of feel, freedom from grit and relative ease or difficulty of developing the full tinctorial strength of the pigment when being ground into a liquid vehicle. The customary test for the last-mentioned property is the preparation of an ink from the given pigment by the aid of lithographic varnish. The pigment and varnish, coarsely mixed, are passed repeatedly over an ink mill. A pigment of good texture will develop substantially fully (over 96%) its maximum tinctorial strength with 2 or 3 passes over the ink mill. A pigment is considered as having poor texture if it requires 4 passes or more. It will be noted here that the ink mill does not subdivide the color particles. The size of the color particles and the ultimate tinctorial strength of the pigment are determined by the treatment which the pigment has received prior to incorporation into the lithovarnish, for instance, acid pasting, ball-milling, salt-milling according to Lang and Detrick above cited, etc. But during isolation, storage, or incorporation into the varnish, the fine particles of the pigment undergo loose agglomeration to some extent, and their full tinctorial strength in the ink will not be developed until all agglomerates have been broken up into substantially the original particle size. It is in relation to this quality of rapid color development or the so-called "good texture," that my invention produces the principal advantage in nearly all cases of phthalocyanine colors. The last phrase includes such colors as exist in two crystalline forms: alpha and beta (for instance, chlorine-free copper phthalocyanine, chlorine-free metal-free phthalocyanine) as well as colors which are known to exist in one form only (for instance, polychloro-copper phthalocyanine, which is known only in one crystalline form and is therefore free of objectionable crystal-growth in aromatic paint vehicles).

Related to this quality of rapid color development and sometimes included under the term "good texture" is also freedom from microscopic grit. The latter term refers to aggregates of fine primary particles, the aggregates being of the order of 1 to 30 microns, whereas the ultimate particle in the pigments produced by this invention is of a size between 0.02 and 0.1 micron. The products of my invention are remarkably free of microscopic grit.

Under the expression "tinctorial qualities" hereinabove I refer to such qualities as brightness, jetness of the masstone and tinctorial strength.

Brightness or brilliance (as opposed to dullness) is a function of the range of variation in the size of individual particles throughout the pigment. The more narrow this variation, the brighter the color. One of the outstanding merits of my improved process is that it produces pigments with a narrow range of particle-size distribution. Accordingly, increased brightness is achieved in nearly all cases.

Related to the same quality is also jetness or "depth" of the masstone. The masstone refers to the color produced by a coating composition containing the pigment in concentrated form, that is without substrata, zinc oxide or other color diluents. The pigments produced according to this invention are excellent from this viewpoint, and are often more jet than pigments produced by the older processes in the art.

Tinctorial strength is another item coming under tinctorial qualities. My pigments are characterized by the highest tinctorial strength, never less and more often exceeding the tinctorial strength of the standards of the same pigments now on the market.

In many cases I find that my process achieves other unexpected but highly desirable improvements, for instance a shift in shade to produce a greener shade of blue or a yellower shade of green, as the case may be.

Finally, I find that the required time in the salt-milling process itself is considerably reduced in most cases by the aid of my invention, which of course is a factor of great economic significance.

Without limiting my invention, the following examples are given to illustrate my preferred mode of operation. Parts mentioned are by weight.

*Example 1*

A steel mill of 30 gal. capacity (diameter 35 inches) was charged with 365 lbs. of ⅝" steel balls, 27 lbs. of dry table salt, 3 lbs. of dry chlorine-free copper phthalocyanine and a solution of one ounce of polytitanium-stearate in 13 oz. of trichloroethylene. The charge was milled with cooling to 40° C. for 11 hours at 38 R. P. M. The mass was then introduced into 29 gals. of water, to make a 10% solution of the salt; the trichloroethylene was distilled off with steam; the pigment was filtered, then stirred at 65°–70° C. for 1.5 hours with 1% hydrochloric acid, to remove iron derived from the mill, filtered, washed free from acid and dried at 60° C. in a humidity controlled dryer.

The beta-copper phthalocyanine thus obtained, was tested against a pigment manufactured in the identical mill, under similar conditions (time, R. P. M. and so forth) and with the same charge, excepting that no dispersant (polytitanium-stearate) was used. Lithographic rub-outs of the pigment powder obtained in the preceding paragraph were of equal strength, but noticeably jetter and brighter.

When chlorine-free-copper phthalocyanine was ball-milled under the same conditions, but in the absence of solvent (trichloroethylene), with or without polytitanium-stearate, the resulting pigment was very much weaker in lithographic ink drawdowns than the product of this example.

*Example 2*

A steel mill with a capacity of 10.6 liters (diameter 32 cm.) was charged with 16 kg. of steel balls of 2.5 cm. diameter, 900 grams of dry table salt, 100 grams of dry chlorine-free copper phthalocyanine and a solution of 2 grams of polytitanium-stearate in 28 cc. of tetrachloroethylene. The charge was milled for 72 hours at 70 R. P. M. and the salt removed by extraction with water; the pigment was further extracted with dilute acid, washed and dried as described in Example 1.

The beta-copper phthalocyanine thus obtained was tested against a pigment powder, prepared in the same mill, under identical conditions and with the identical charge, except that no polytitanium-stearate was employed. Lithographic rub-outs of the pigment powder, obtained in the first paragraph above, were considerably jetter and brighter.

In another experiment, the above procedure was repeated except that 1,1,2-trichloroethane was employed as the solvent. The results were equally gratifying.

*Example 3*

A steel mill with a capacity of 1600 gals. (diameter 6 feet) was charged with 20,000 lbs. of so-called "Cylpebs" (steel cylinders with oval ends, 1 inch long, having 0.5 inch diameter), 1800 lbs. of dry table salt, 196 lbs. of dry chlorine-free copper phthalocyanine (mixture of alpha- and beta-crystal modifications) and 4 lbs. of di-chloro-tin-phthalocyanine. After 0.5 hour milling a solution of 2 lbs. of sorbitan-mono-oleate (U. S. P. 2,380,166) in 40 lbs. of tetra-chloroethylene was added and the entire charge milled for 12 hours at 27 R. P. M., while cooling water kept the temperature of the mill at 50° to 60° C. The charge was introduced into water as to make a 10% solution of salt, the tetrachloroethylene was distilled off with steam, the pigment filtered, acid-extracted and worked into a pigment powder as described in Example 1. The beta-copper phthalocyanine pigment thus obtained was considerably brighter and tinctorially stronger in lithographic varnish rub-outs, also appreciably greener than the best known commercial standard of this pigment.

The powder, as well as the press cake, gave lithographic rub-outs which were jetter, stronger and brighter than those of corresponding preparations resulting from salt-solvent milling in the absence of the dispersing agent, i. e., sorbitan-mono-oleate. The texture of the pigment, made according to this invention, as judged by strength development tests on the ink mill, was excellent.

An electron photomicrograph made with powder, manufactured following this example showed a narrow size distribution of primary particles. The largest single crystal or primary particle in the electron photomicrograph (disregarding agglomerates and microscopic grit) are 0.06 micron in length. The average particle size calculated from powder surface measurements made with the same pigment powder following Emmett's nitrogen absorption method was 0.04 micron. The maximum particle thus differs only by 0.02 micron from the average particle size, indicating altogether a very narrow distribution range of particle size.

*Example 4*

The steel mill of Example 2 was charged with the same quantity of steel balls and salt as in Example 2, and then 98 grams of dry chlorine-free-copper phthalocyanine (same as in Example 3), 2 grams of dichloro-tin phthalocyanine and a solution of 2 grams of sorbitan-mono-stearate, in 28 cc. of tetrachloroethylene were added. The charge was milled for 72 hours at about 70 R. P. M., and the product was isolated as described in Example 1. The resulting blue pigment powder gave brighter, greener and tinctorially stronger lithographic ink drawdowns than the best known commercial standard of the same pigment. The texture of the pigment was excellent.

*Example 5*

A steel mill with a capacity of 6.5 liters (diameter 22 cm.) was charged with 14.5 kg. of steel balls of 1 inch diameter, 675 grams of dry table salt, 73.5 grams of dry chlorine-free copper phthalocyanine, 1.5 grams of dichlor-tin phthalocyanine and a solution of 1 gram of polytitanium stearate in 27 cc. of tetrachloroethylene. After 72 hours milling at 88 R. P. M. the product was isolated as described in Example 1. The resulting blue pigment powder was judged in lithographic varnish rub-outs against a solvent-milled powder made without the auxiliary agent, and was found to be noticeably more jet, greener, brighter and stronger. It contained 0.05 to 0.1% elemental titanium, as determined by spectrophotometric analysis.

Flushed press cakes of the pigment made following this example also showed equal strength to press cakes originating from solvent-milled pigment made without auxiliary agent, but gave considerably brighter and greener blue shades.

In another experiment, a portion of the same crude color as in this example was milled by the procedure of this example, except that anhydrous sodium sulfate was employed in place of dry table salt. The resulting pigment powder was jetter and brighter than a commercially available standard, and of equal lithographic strength.

*Example 6*

In this example metal-free phthalocyanine of beta-crystal modification was used as starting material, the crude having crystals of 10 to 20 micron length. The procedure, materials and apparatus were otherwise as in Example 5, followed by working up as in Example 1 up to and including the step of extraction with 1% hydrochloric acid. After a second filtration and reslurrying of the press cake, the pigment was extracted at 65° C. for 1 hour with 1% aqueous caustic soda. The greenish blue pigment obtained was again filtered, washed free from alkali and dried at 60° C. in a humidity controlled dryer. The pigment powder thus obtained was stronger and brighter in lithographic varnish tests than a corresponding powder, prepared in an analogous manner from the same crude in the absence of the fatty auxiliary agent.

*Example 7*

A steel mill was charged with steel balls and salt as in Example 2, and then the following were added: 96 grams of a crude copper phthalocyanine, containing about 4 to 4.5% chlorine (made by replacing part of the original phthalic anhydride by 4-chloro-phthalic acid), 2 grams of dichloro-tin phthalocyanine and a solution of 2 grams of polytitanium-stearate in 28 cc. of tetrachloroethylene. The charge was milled for 72 hours at about 63 R. P. M. and the product was isolated as described in Example 1. The resulting blue pigment powder, when analyzed by X-ray, displayed a pattern similar to that of alpha-chlorine-free copper phthalocyanine. Its lithographic rub-outs were considerably more jet, bright and green than those of a semi-chloro-copper phthalocyanine salt-milled in the presence of tetrachloroethylene but without my added auxiliary, fatty agent. Strength development on the ink mill was equal to that of the aforementioned standard. The product was also superior to acid-pasted semi-chloro-copper phthalocyanine.

In another experiment, a portion of the same crude color as in this example was milled in the 30-gallon mill of Example 1, following the details of Example 1 except that the salt-pigment ratio was 6:1 and the milling time was 14 hours. The quality of the resulting pigment powder was highly satisfactory.

*Example 8*

The apparatus and procedure were as in Example 7, except that the semi-chloro-copper phthalocyanine was replaced by monochloro-copper phthalocyanine. The resulting powder gave excellent strength development in texture tests on the ink mill. When compared in lithographic rub-outs against monochloro-copper phthalocyanine, which was salt-milled in the absence of solvent and auxiliary, the new pigment was 25% stronger and noticeably brighter.

*Example 9*

A friction top, one-quart tin can (diameter 4.25″) was charged with 2,000 grams of steel balls (1:1 mixture of balls with ¼″ and ⅜″ diameter), 180 grams of dry table salt, 20 grams of crude polychloro-copper phthalocyanine (over 47% Cl) and a solution of 0.2 grams of polytitanium-stearate in 3 cc. of tetrachloroethylene. The charge was milled for 72 hours at 78 R. P. M.

and was then worked up as in Example 1. The resulting green powder was tested in lithographic ink drawdowns against a commercially available standard lot of the same pigment and was judged more jet, more bright, more blue and 30% stronger.

Appreciable improvements in brightness and strength were also achieved when the same polychloro-copper phthalocyanine was salt-solvent-milled as above except that the auxiliary fatty agent was replaced by an equal weight of triethanolaminelauric acid ester, sorbitan mono-oleate or polytitanium-dioleate.

Example 10

The mill of Example 1 was charged with steel balls and salt as in Example 1. Then 3.1 lbs. of polychloro-metal-free phthalocyanine (Cl content 51.2%) and a solution of 2 oz. of sorbitan mono-oleate in 13 oz. of tetrachloroethylene were added. The charge was milled with cooling to 40° C. for 14 hours at 38 R. P. M. and then worked up as in Example 1. The resulting powder was tested in lithographic ink drawdowns against polychloro-metal-free phthalocyanine standard, which was salt-milled in the absence of solvent and auxiliary agent. The tests showed the new powder to be more jet, yellow, and bright and 12.5% stronger than the standard.

Example 11

The steel mill of Example 2 was charged with steel balls and salt as in Example 2. 100 grams of polychloro-copper phthalocyanine (Cl content over 47%), and a solution of 2 grams of sorbitan-mono-oleate in 27 cc. of isopropanol were then added. The mixture was milled for 72 hours at 70 R. P. M.; the salt was then removed and the pigment was extracted with dilute acid, washed and dried as described in Example 1. The resulting powder was tested in lithographic ink drawdowns against a present commercial standard of the same color and found to be more jet, blue, and bright and 35% stronger.

The copper phthalocyanine employed in Examples 1, 2, 3, 4 and 5 hereinabove was "urea-process" material; that is, it was prepared from phthalic anhydride, cupric chloride, urea, boric acid and ammonium molybdate, according to U. S. P. 2,197,458 and 2,214,477.

The polytitanium-stearate employed in Examples 5, 6 and 9 was prepared from stearic acid and titanium-tetrachloride according to Example 1 of copending application of Balthis, Serial No. 176,056. The one employed in Examples 1, 2, 7 and 8 was prepared from stearic acid and tetraisopropyl titanate and corresponded in composition essentially to the product of Example 5 of copending application of Langkammerer, Serial No. 170,703.

The sorbitan monooleate employed in Examples 3, 10 and 11 were prepared from equimolecular quantities of sorbitol and oleic acid according to the procedure of Example 1 of U. S. P. 2,380,166. The sorbitan monostearate used in Example 4 was prepared in similar fashion from sorbitol and stearic acid.

In addition to the good qualities recited in each of the examples above, the products in all the aforegoing examples were found to possess good texture, in the sense that they were essentially free from microscopic grit and developed 95% of their tinctorial strength in 1 or 2 passes over the ink-mill. This is at least as good as the best commercial standards at this date, but usually much better inasmuch as acid-pasted material and other commercial brands of the phthalocyanine coloring matters usually require from 2 to 4 passes over the ink-mill.

In any of the aforegoing examples, the specified auxiliary agent may be replaced by other solvent-soluble fatty-acid compounds having the property of acting as dispersing agents in organic media. In addition to the specific instances given hereinabove, I found the following useful for my invention: aluminum stearate, hexyl-phenyl stearate, calcium naphthenate triethanolamine lauric acid ester, and other similar fatty-acid compounds.

Mixtures of the above various agents among themselves as well as with other solvent-soluble organic compounds containing long-chain fatty acid radicals may be employed. A particularly good instance of such permissible adjuvants are the free fatty acids themselves. Thus, it has been observed that, if in lieu of pure polytitanium-stearate, mixtures of the same with free stearic acid are employed, the results are as good as when the pure ester was employed by itself. Furthermore, it has been observed that when polychloro-copper phthalocyanine (over 15 Cl atoms) was the color, and a polytitanium-stearate grade was employed containing about 50% by weight of free stearic acid, the resulting pigment had the added advantage that it did not flocculate when incorporated in nitrocellulose lacquers. This is a particularly lucky observation, inasmuch as polychloro-copper phthalocyanine has heretofore been suffering badly from this particular misbehavior.

It will be understood that while the above examples are detailed and specific, considerable variations thereof may be practiced without departing from the spirit of this invention.

Thus, although a water-insoluble, steam-distillable organic liquid has been indicated as preferred in most procedures, in certain cases this may be replaced by water-soluble organic liquids, for instance acetone, methyl alcohol or ethyl alcohol. This is illustrated in the case of polychloro-copper phthalocyanine (Example 11), which gives good results with such solvents. As a general proposition, however, water-immiscible liquids are preferred, inasmuch as they give good results in all cases. Other practical considerations (non-flammability, ease of distillation, etc.) may further limit the choice of preferred solvents to certain individuals, as more fully set forth in said copending application of Graham, Serial No. 79,894 (Patent No. 2,556,728).

The salt-pigment ratio may vary widely within the limits (4 to 20) indicated in U. S. P. 2,402,167. However, from practical considerations I find a ratio of 6 to 9 parts salt for each part of pigment more economical.

I claim as my invention:

1. The process of converting a phthalocyanine coloring matter into a fine particle size adapted for use as a pigment in liquid organic paint vehicles, which comprises subjecting such coloring matter to ball milling with from 4 to 20 times its own weight of an inorganic, water-soluble salt, the mixture being milled having incorporated therein a water-immiscible, steam-distillable organic liquid in quantity from 0.1 to 0.5 part by weight for each part by weight of coloring matter in the mixture, said liquid being one which is characterized by its ability to transform the alpha form of copper phthalocyanine into the beta form, and said mixture having further incorporated therein a solvent-active dispersant selected from the group consisting of polytitanium esters of long-chain fatty acids and sorbitan esters of long-chain fatty acids in quantity of from 0.01 to 0.1 part by weight for each part by weight of coloring matter in the mixture.

2. A process as in claim 1, the milling being followed by washing with water to remove the salt and by steam distilling to remove the organic liquid.

3. The process of converting a phthalocyanine coloring matter into a fine particle size adapted for use as a pigment in liquid organic paint vehicles, which comprises subjecting such coloring matter to ball milling with from 6 to 9 times its own weight of an inorganic, water-soluble salt, the mixture being milled having incorporated therein a water-immiscible, steam-distillable organic liquid selected from the group consisting of trichloroethylene, tetrachloroethylene and 1,1,2-trichloroethane, in quantity between 0.1 and 0.5 part by weight for each part of coloring matter, and said mixture having further incorporated therein polytitanium stearate in quantity of from 0.01 to 0.1 part by weight for each part by weight of coloring matter.

4. A process as in claim 3, the milling being following by washing with water to remove the salt and by steam-distilling to remove the organic liquid.

5. A process as in claim 3, the coloring matter being polychlorinated copper phthalocyanine.

6. A process as in claim 3, the coloring matter being chlorine-free copper phthalocyanine.

7. A process as in claim 3, the coloring matter being a mixture of chlorine-free and monochloro copper phthalocyanine.

8. A process as in claim 3, the coloring matter being chlorine-free, metal-free phthalocyanine.

HANS B. GOTTLIEB.

References Cited in the file of this patent

UNITED STATES PATENTS

| Number | Name | Date |
|---|---|---|
| 2,402,167 | Lang | June 18, 1946 |
| 2,556,727 | Lane | June 12, 1951 |
| 2,556,728 | Graham | June 12, 1951 |
| 2,556,730 | Graham | June 12, 1951 |

FOREIGN PATENTS

| Number | Country | Date |
|---|---|---|
| 569,402 | Great Britain | May 22, 1945 |